United States Patent
Wang et al.

(10) Patent No.: US 10,439,234 B2
(45) Date of Patent: *Oct. 8, 2019

(54) SOLID OXIDE FUEL CELL

(71) Applicant: NATIONAL TAIPEI UNIVERSITY OF TECHNOLOGY, Taipei (TW)

(72) Inventors: Sea-Fue Wang, Taipei (TW); Hsi-Chuan Lu, Taipei (TW)

(73) Assignee: National Taipei University of Technology, Taipei (TW)

( * ) Notice: Subject to any disclaimer, the term of this patent is extended or adjusted under 35 U.S.C. 154(b) by 119 days.

This patent is subject to a terminal disclaimer.

(21) Appl. No.: 15/661,865

(22) Filed: Jul. 27, 2017

(65) Prior Publication Data

US 2018/0183072 A1 Jun. 28, 2018

Related U.S. Application Data

(63) Continuation of application No. 15/387,833, filed on Dec. 22, 2016, now Pat. No. 10,170,773.

(51) Int. Cl.
| | |
|---|---|
| *H01M 8/026* | (2016.01) |
| *H01M 8/0282* | (2016.01) |
| *H01M 8/0271* | (2016.01) |
| *H01M 8/2432* | (2016.01) |
| *H01M 8/0273* | (2016.01) |
| *H01M 8/124* | (2016.01) |
| *H01M 8/242* | (2016.01) |

(52) U.S. Cl.
CPC ......... *H01M 8/026* (2013.01); *H01M 8/0271* (2013.01); *H01M 8/0273* (2013.01); *H01M 8/0282* (2013.01); *H01M 8/2432* (2016.02); *H01M 8/242* (2013.01); *H01M 2008/1293* (2013.01); *Y02P 70/56* (2015.11)

(58) Field of Classification Search
CPC .. H01M 8/026; H01M 8/0273; H01M 8/0282; H01M 2008/1293; H01M 8/0258; H01M 8/0271; H01M 8/0276; H01M 8/2484; H01M 8/2485; H01M 8/2415; H01M 8/242; H01M 8/2432
See application file for complete search history.

(56) References Cited

U.S. PATENT DOCUMENTS

| | | | | |
|---|---|---|---|---|
| 6,040,076 | A * | 3/2000 | Reeder | H01M 8/0206 429/460 |
| 6,410,179 | B1 * | 6/2002 | Boyer | H01M 8/0247 429/457 |
| 2003/0072986 | A1 * | 4/2003 | Kusakabe | H01M 8/0213 429/435 |

FOREIGN PATENT DOCUMENTS

TW    I513090 B    12/2015

* cited by examiner

*Primary Examiner* — Amy Cohen Johnson
*Assistant Examiner* — Paul D Baillargeon
(74) *Attorney, Agent, or Firm* — Michael Best & Friedrich LLP (57) ABSTRACT

A modular planar interconnect device for a solid oxide fuel cell includes a planar interconnect body, a pair of upper shielding plates, and a pair of lower shielding plates. The upper shielding plates are configured to be respectively fitted between front and rear boundary wall surfaces of a first inlet region of the planar interconnect body and between front and rear boundary wall surfaces of a first outlet region of the planar interconnect body. The lower shielding plates are configured to be respectively fitted between right and left boundary wall surfaces of a second inlet region of the planar interconnect body and between right and left boundary wall surfaces of a second outlet region of the planar interconnect body.

6 Claims, 8 Drawing Sheets

SOLID OXIDE FUEL CELL

CROSS-REFERENCE TO RELATED APPLICATION

This patent application is a continuation of U.S. patent application Ser. No. 15/387,833, filed Dec. 22, 2016.

FIELD

The disclosure relates to a modular planar interconnect device, and more particularly to a modular planar interconnect device for a solid oxide fuel cell. The disclosure also relates to the solid oxide fuel cell containing the modular planar interconnect device.

BACKGROUND

A fuel cell is a device that converts chemical enemy from a fuel into electricity through a chemical reaction of positively charged hydrogen ions with oxygen or another oxidizing agent. The fuel cell can produce electricity continuously for as long as fuel and oxygen or air are supplied continuously. Particularly, a planar solid oxide fuel cell is more popular in various applications because it has advantages of durable stability and low production cost and because a plurality of the planar solid oxide fuel cells may be stacked and electrically connected in series to produce high voltage.

However, in a stack of the conventional planar solid oxide fuel cells, the power efficiency and stability thereof may be negatively affected due to the fact that deformation of a seal material used for stacking the planar solid oxide fuel cells may affect flow of a fuel fluid and/or that the seal material may come into contact with the fuel fluid to react with the fuel fluid or to be eluted by the fuel fluid. In addition, it is desirable in the art to provide a solid oxide fuel cell having enhanced power density, fuel utilization, and power efficiency.

SUMMARY

Therefore, an object of the disclosure is to provide a solid oxide fuel cell which may overcome the disadvantages of the conventional planar solid oxide fuel cell and which has enhanced power density, fuel utilization, and power efficiency.

According to a first aspect of the disclosure, there is provided a modular planar interconnect device for being sandwiched between a pair of planar cell units, each of which includes an anode web, a cathode web, and a planar cell body sandwiched between the anode and cathode webs. The modular planar interconnect device comprises a planar interconnect body, a pair of upper shielding plates, and a pair of lower shielding plates.

The planar interconnect body includes an upper major surface and a lower major surface.

The upper major surface includes a right marginal region, a left marginal region, an upper main region, a first inlet region for an oxygen-containing fluid, a first outlet region for the oxygen-containing fluid, and a plurality of grooved channels. The left marginal region is disposed opposite to the right marginal region in a longitudinal direction. The upper main region is disposed between the right and left marginal regions for underlying the cathode web of an upper one of the planar cell units. The first inlet region is disposed between the right marginal region and the upper main region, and is formed with a first inlet depression area that is recessed from the upper major surface downwardly and inwardly so as to form front and rear boundary wall surfaces spaced apart from each other in a transverse direction. The first outlet region is disposed between the left marginal region and the upper main region, and is formed with a first outlet depression area that is recessed from the upper major surface downwardly and inwardly so as to form front and rear boundary wall surfaces spaced apart from each other in the transverse direction. The grooved channels are formed in the upper main region of the upper major surface, and extend through the first inlet region to terminate at a plurality of first inlet ports and further through the first outlet region to terminate at a plurality of first outlet ports.

The lower major surface includes a front marginal region, a rear marginal region, a lower main region, a second inlet region for a fuel fluid, a second outlet region for the fuel fluid, and a plurality of grooved channels. The rear marginal region is disposed opposite to the front marginal region in the transverse direction. The lower main region is disposed between the front and rear marginal regions for overlying the anode web of a lower one of the planar cell units. The second inlet region is disposed between the front marginal region and the lower main region, and is formed with a second inlet depression area that is recessed from the lower major surface upwardly and inwardly so as to form right and left boundary wall surfaces spaced apart from each other in the longitudinal direction. The second outlet region is disposed between the rear marginal region and the lower main region, and is formed with a second outlet depression area that is recessed from the lower major surface upwardly and inwardly so as to form right and left boundary wall surfaces spaced apart from each other in the longitudinal direction. The grooved channels are formed in the lower main region of the lower major surface, and extend through the second inlet region to terminate at a plurality of second inlet ports and further through the second outlet region to terminate at a plurality of second outlet ports.

The upper shielding plates are configured to be respectively fitted between the front and rear boundary wall surfaces of the first inlet region and between the front and rear boundary wall surfaces of said first outlet region.

The lower shielding plates is configured to be respectively fitted between the right and left boundary wall surfaces of the second inlet region and between the right and left boundary wall surfaces of the second outlet region.

According to a second aspect of the disclosure, there is provided a solid oxide fuel cell which comprises upper and lower modular planar interconnect devices, and a planar cell. Unit.

Each of the upper and lower modular planar interconnect devices is the modular planar interconnect device described above.

The planar cell unit is sandwiched between the upper and lower modular planar interconnect devices, and includes a planar cell member, an anode member, a cathode member, an upper first auxiliary seal member, and a lower upper first auxiliary seal member.

The planar cell member includes a planar cell body and a cell-body support frame. The planar cell body is interposed between the lower main region of the lower major surface of the upper modular planar interconnect device and the upper main region of the upper major surface of the lower modular planar interconnect device. The cell-body support frame is disposed to surround and support a periphery of the planar cell body, and has upper front and rear support regions and lower right and left support regions. The upper front and rear support regions are opposite to each other in the transverse direction, and respectively mate with the second inlet and outlet regions of the lower major surface of the upper modular planar interconnect device. The lower right and left support regions are opposite to each other in the longitudinal direction, and respectively mate with the first inlet and outlet regions of the upper major surface of the lower modular planar interconnect device.

The anode member includes an anode web and an anode frame. The anode web is sandwiched between the planar cell body and the lower major region of the lower major surface of the upper modular planar interconnect device. The anode frame is disposed to surround and support a periphery of the anode web and has front and rear anode frame regions which are opposite to each other in the transverse direction, and which respectively mate with the second inlet and outlet regions of the lower major surface of the upper modular planar interconnect device.

The cathode member includes a cathode web and a cathode frame. The cathode web is sandwiched between the planar cell body and the upper major region of the upper major surface of the lower modular planar interconnect device. The cathode frame is disposed to surround and support a periphery of the cathode web and has right and left cathode frame regions which are opposite to each other in the longitudinal direction, and which respectively mate with the first inlet and outlet regions of the upper major surface of the lower modular planar interconnect device.

The upper first auxiliary seal member is disposed between one of the front and rear anode frame regions of the anode frame and a corresponding one of the second inlet and outlet regions of the lower major surface of the upper modular planar interconnect device to form a fluid-tight seal therebetween.

The lower first auxiliary seal member is disposed between one of the right and left cathode frame regions of the cathode frame and a corresponding one of the first inlet and outlet regions of the upper major surface of the lower modular planar interconnect device to form a fluid-tight seal therebetween.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1, 2, 7, and 8, an embodiment of a modular planar interconnect device 2 according to the disclosure is shown to be sandwiched between a pair of planar cell units 3. Each of the planar cell units 3 includes an anode web 34, a cathode web 35, and a planar cell body 33 sandwiched between the anode and cathode webs 34, 35.

Figure 1:
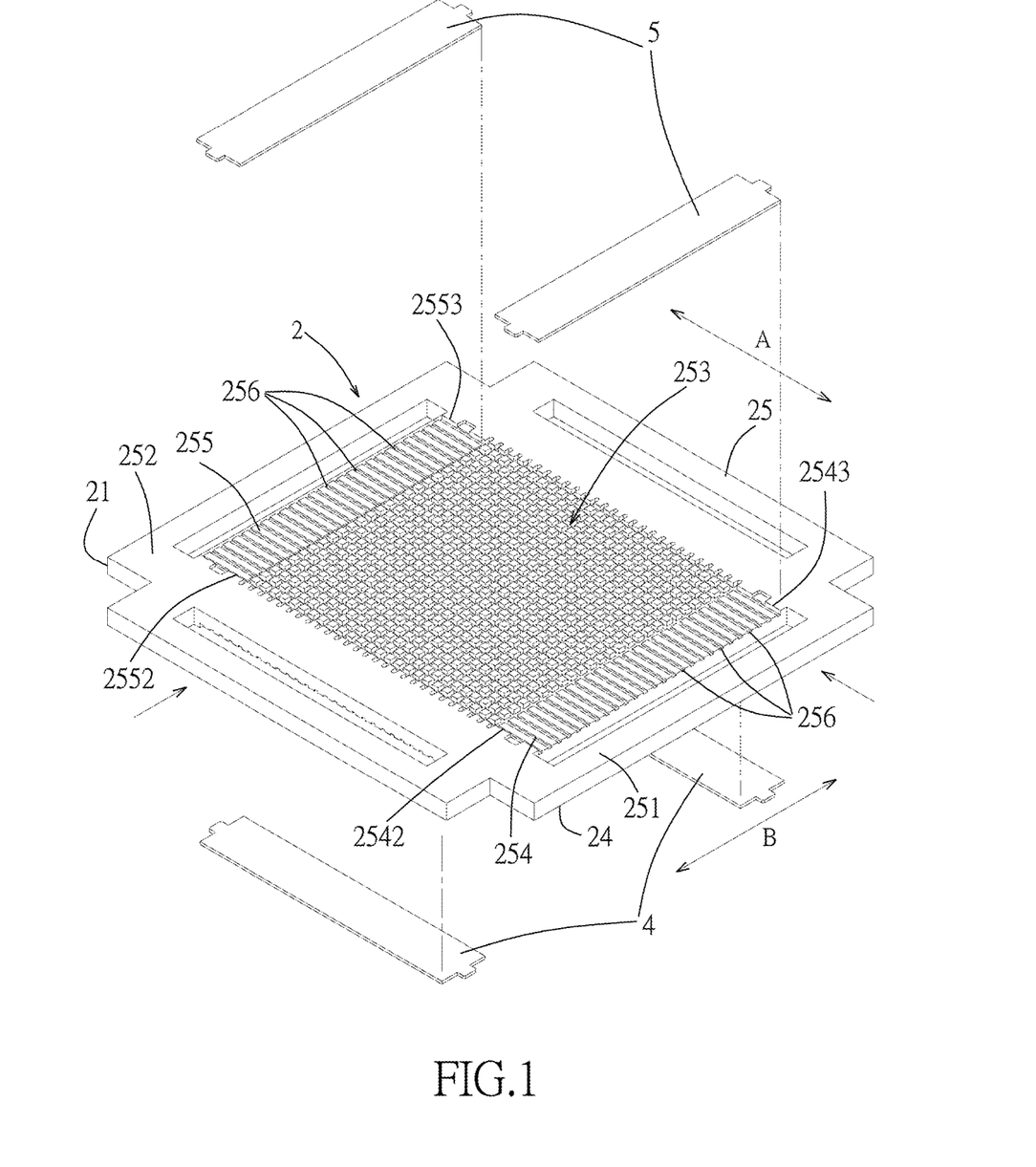
FIG. 1 is a perspective exploded view of an embodiment of a modular planar interconnect device according to the disclosure.
Figure 2:
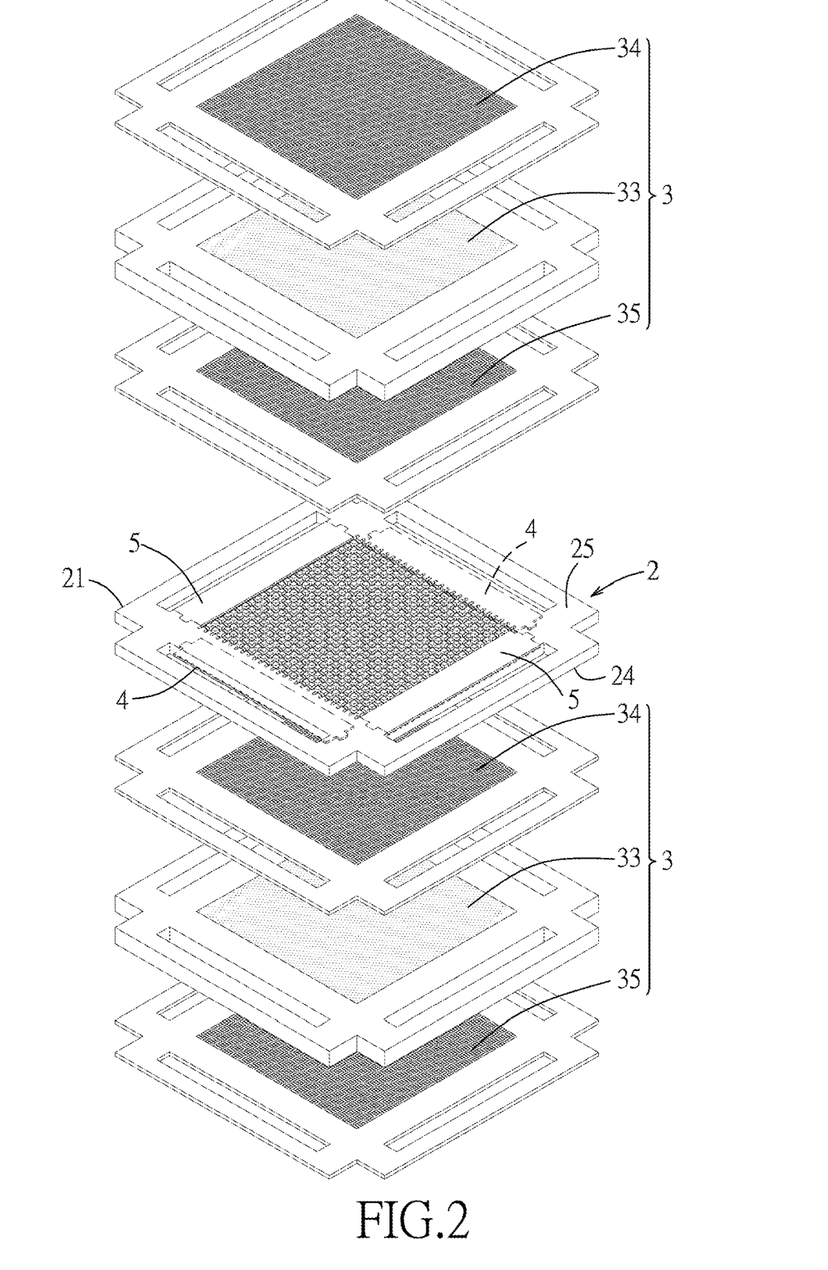
FIG. 2 is a perspective exploded view of the embodiment of the modular planar interconnect device sandwiched between a pair of planar cell units.

The modular planar interconnect device 2 is shown to include a planar interconnect body 21, a pair of upper shielding plates 5, and a pair of lower shielding plates 4. The planar interconnect body 21 and the upper and lower shielding plates 5, 4 are made from a stainless steel material such as SUS 430, SUS 431, SUS 441, Crofer® 22, and the like. In the embodiment, the planar interconnect body 21, the upper shielding plates 5, and the lower shielding plates 4 are formed separately. Alternatively, they may be formed as a single-piece configuration.

The planar interconnect body 21 includes an upper major surface 25 and a lower major surface 24.

Figure 7:
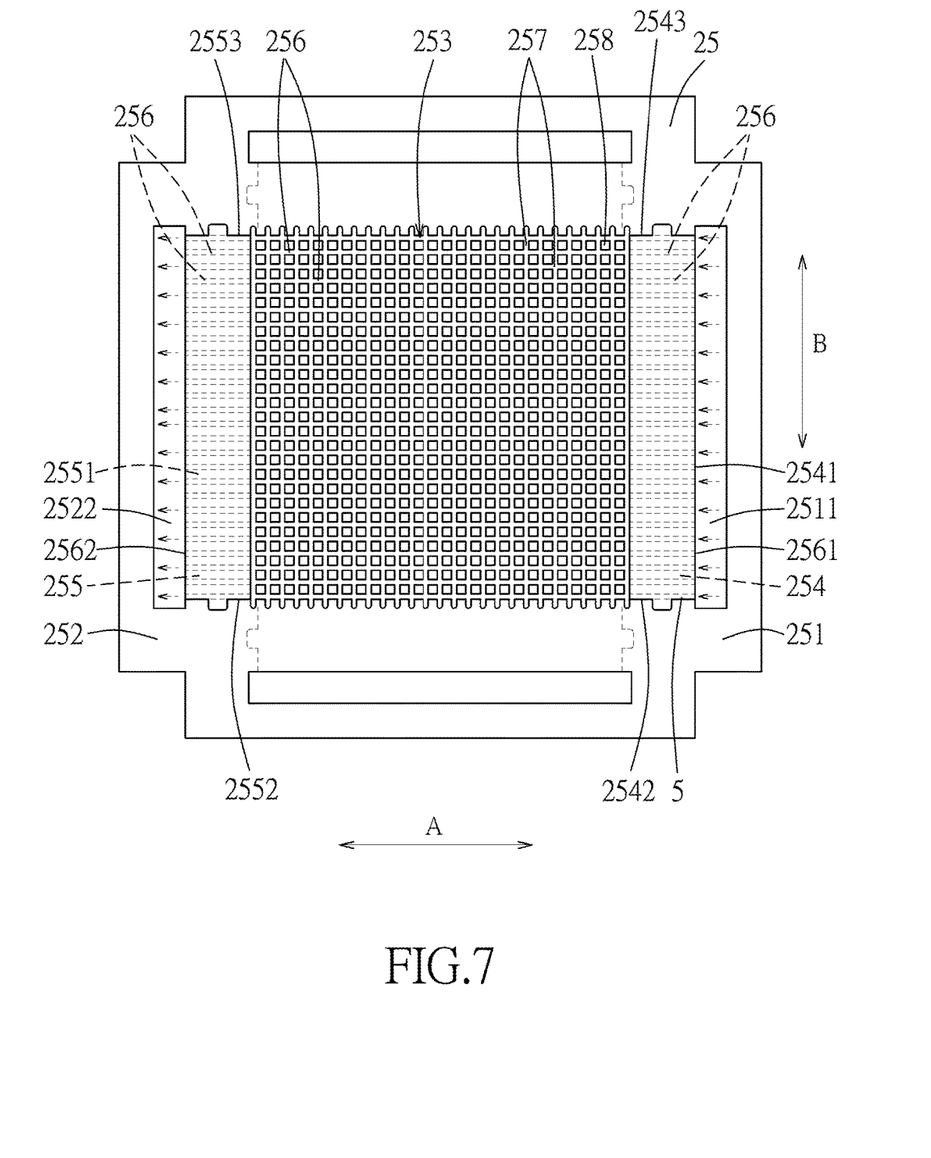
FIG. 7 is a is a schematic top view of the embodiment of the solid oxide fuel cell.

The upper major surface 25 includes a right marginal region 251, a left marginal region 252, an upper main region 253, a first inlet region 254 for an oxygen-containing fluid, a first outlet region 255 for the oxygen-containing fluid, and a plurality of grooved channels 256. The left marginal region 252 is disposed opposite to the right marginal region 251 in a longitudinal direction (A). The upper main region 253 is disposed between the right and left marginal regions 251, 252 and is configured for underlying the cathode web 35 of an upper one of the planar cell units 3. The first inlet region 254 is disposed between the right marginal region 251 and the upper main region 253, and is formed with a first inlet depression area 2541 that is recessed from the upper major surface 25 downwardly and inwardly so as to form front and rear boundary wall surfaces 2542, 2543 spaced apart from each other in a transverse direction (B). The first outlet region 255 is disposed between the left marginal region 252 and the upper main region 253, and is formed with a first outlet depression area 2551 that is recessed from the upper major surface 25 downwardly and inwardly so as to form front and rear boundary wall surfaces 2552, 2553 spaced apart from each other in the transverse direction (B). The grooved channels 256 are formed in the upper main region 253 of the upper major surface 25, and extend through the first inlet region 254 to terminate at a plurality of first inlet ports 2561 and further through the first outlet region 255 to terminate at a plurality of first outlet ports 2562. The upper main region 253 of the upper major surface 25 is further formed with a plurality of auxiliary channels 257 transverse to the grooved channels 256 in the upper main region 253 of the upper major surface 25 so as to form an array of upper bumps 258. In addition, the right marginal region 251 has a first introducing slot 2511 extending from the upper major surface 25 to the lower major surface 24 so as to fluidly communicate with the first inlet ports 2561. The left marginal region 252 has a first exit slot 2522 extending from the upper major surface 25 to the lower major surface 24 so as to fluidly communicate with the first outlet ports 2562.

Figure 8:
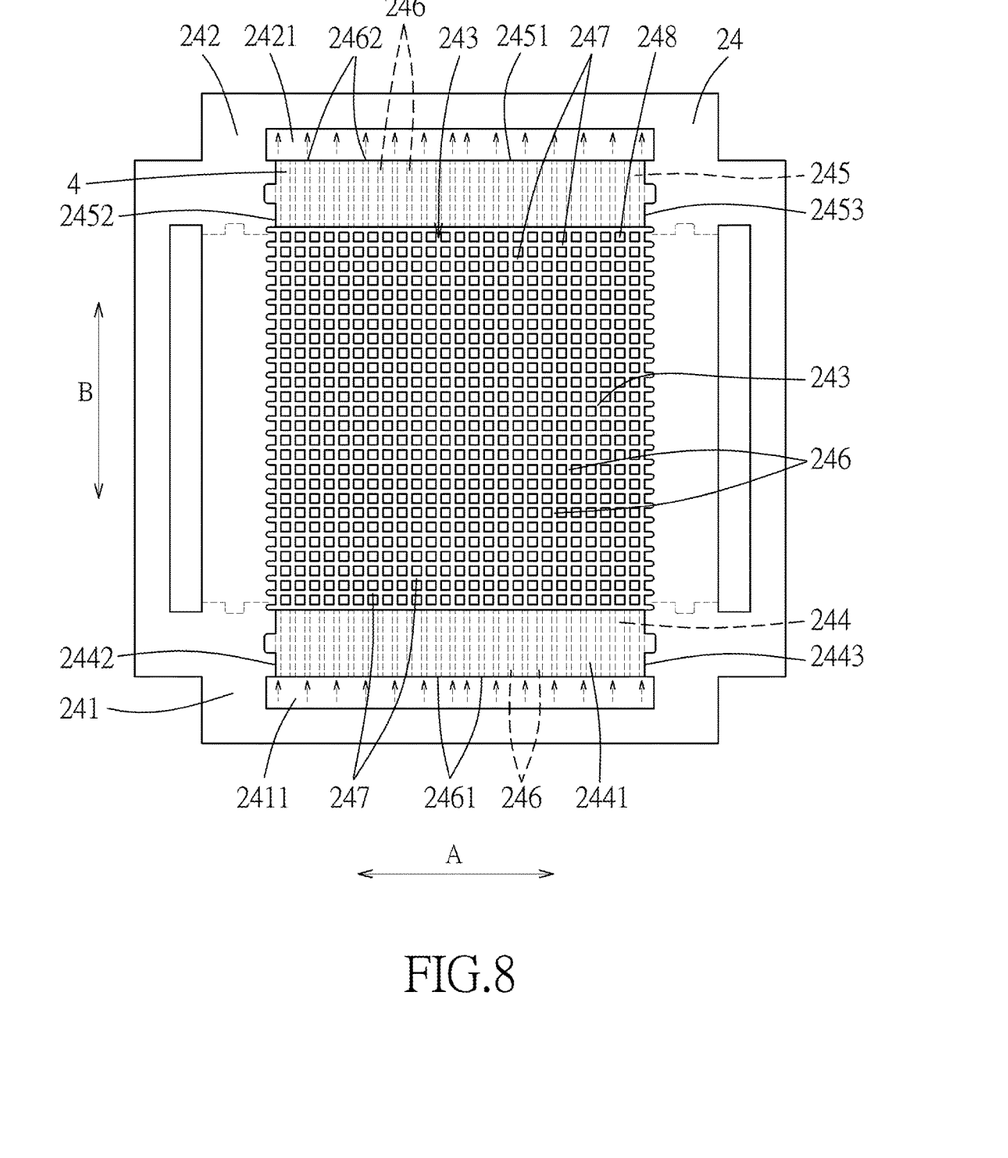
FIG. 8 is a schematic bottom view of the embodiment of the solid oxide fuel cell.

The lower major surface 24 includes a front marginal region 241, a rear marginal region 242, a lower main region 243, a second inlet region 244 for a fuel fluid, a second outlet region 245 for the fuel fluid, and a plurality of grooved channels 246. The rear marginal region 242 is disposed opposite to the front marginal region 241 in the transverse direction (B). The lower main region 243 is disposed between the front and rear marginal regions 241, 242 for overlying the anode web 34 of a lower one of the planar cell units 3. The second inlet region 244 is disposed between the front marginal region 241 and the lower main region 243, and is formed with a second inlet depression area 2441 that is recessed from the lower major surface 24 upwardly and inwardly so as to form right and left boundary wall surfaces 2442, 2443 that are spaced apart from each other in the longitudinal direction (A). The second outlet region 245 is disposed between the rear marginal region 242 and the lower main region 243, and is formed with a second outlet depression area 2451 that is recessed from the lower major surface 24 upwardly and inwardly so as to form right and left boundary wall surfaces 2452, 2453 that are spaced apart from each other in the longitudinal direction (A). The grooved channels 246 are formed in the lower main region 243 of the lower major surface 24, and extend through the second inlet region 244 to terminate at a plurality of second inlet ports 2461 and further through the second outlet region 245 to terminate at a plurality of second outlet ports 2462. In a certain embodiment, a cross-section of the grooved channels 246 at a juncture between the lower main region 243 and the second inlet region 244 of the lower major surface 24 is larger than a cross-section thereof at a juncture between the lower main region 243 and the second outlet region 245 of the lower major surface 24. The lower main region 243 of the lower major surface 24 is further formed with a plurality of auxiliary channels 247 transverse to the grooved channels 246 in the lower main region 243 of the lower major surface 24 so as to form an array of lower bumps 248. In addition, the front marginal region 241 has a second introducing slot 2411 extending from the lower major surface 24 to the upper major surface 25 so as to fluidly communicate with the second inlet ports 2461. The rear marginal region 242 has a second exit slot 2421 extending from the lower major surface 24 to the upper major surface 25 so as to fluidly communicate with the second outlet ports 2462.

The upper shielding plates 5 are configured to be detachably and respectively fitted between the front and rear boundary wall surfaces 2542, 2543 of the first inlet region 254 and between the front and rear boundary wall surfaces 2552, 2553 of the first outlet region 255. The upper shielding plates 5 are flush with the right and left marginal regions 251, 252 of the upper major surface 25.

The lower shielding plates 4 are configured to be detachably and respectively fitted between the right and left boundary wall surfaces 2442, 2443 of the second inlet region 244 and between the right and left boundary wall surfaces 2452, 2453 of the second outlet region 245. The lower shielding plates 4 are flush with the front and rear marginal regions 241, 242 of the lower major surface 24.

With reference to FIGS. 3-6, an embodiment of a solid oxide fuel cell 1 according to the disclosure includes upper and lower modular planar interconnect devices 2, and a planar cell unit 3 sandwiched between the upper and lower modular planar interconnect devices 2.

Figure 3:
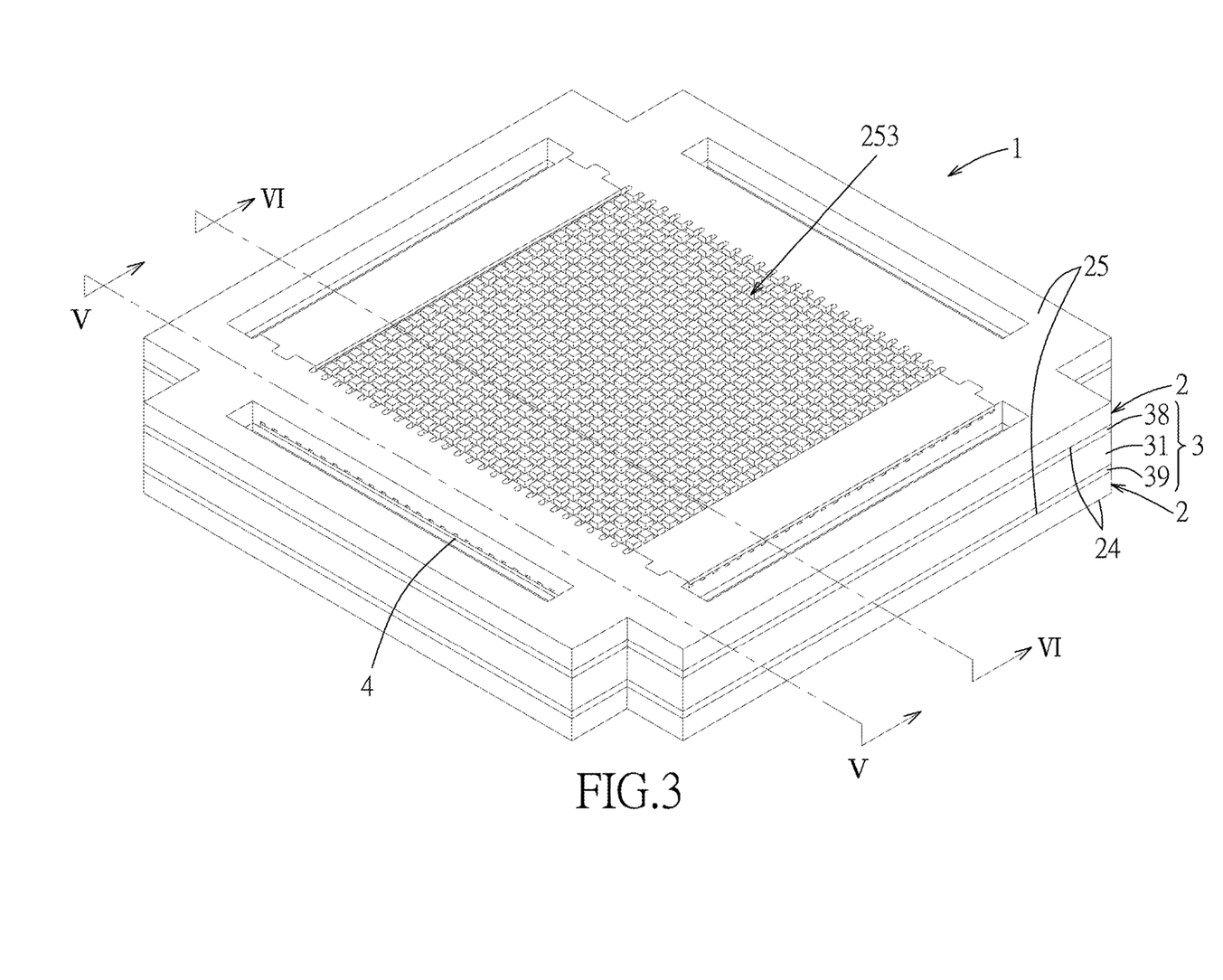
FIG. 3 is a perspective view of an embodiment of a solid oxide fuel cell according to the disclosure.
Figure 4:
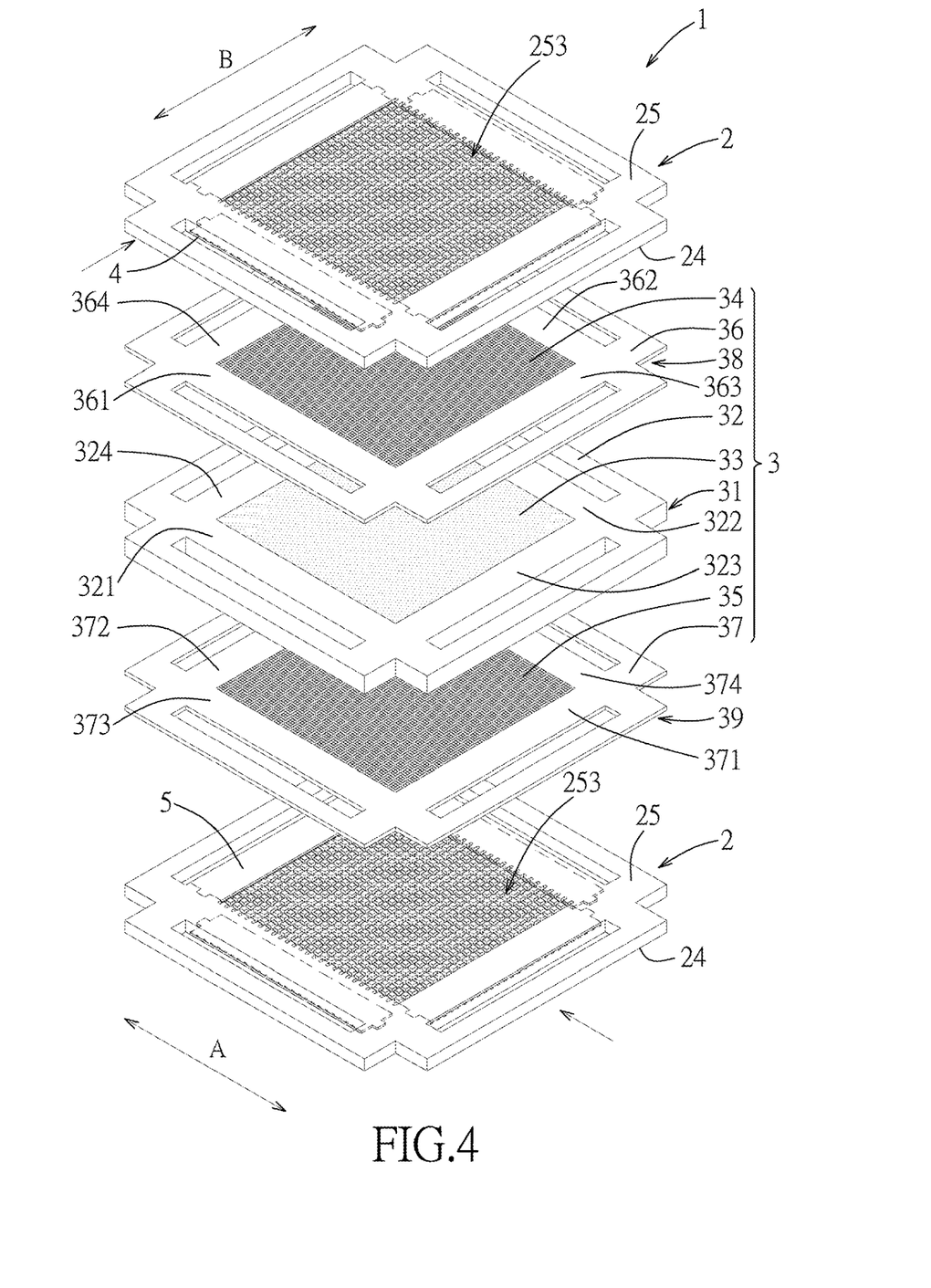
FIG. 4 is a perspective exploded view of the embodiment of the solid oxide fuel cell.

Each of the upper and lower modular planar interconnect devices 2 is the modular planar interconnect devices 2 described above.

The planar cell unit 3 includes a planar cell member 31, an anode member 38, a cathode member 39, an upper first auxiliary seal member, and a lower first auxiliary seal member. The planar cell member 31 includes a planar cell body 33 and a cell-body support frame 32. The anode member 38 includes an anode web 34 and an anode frame 36. The cathode member 39 includes a cathode web 35 and a cathode frame 37.

The planar cell body 33 is interposed between the lower main region 243 of the lower major surface 24 of the upper modular planar interconnect device 2 and the upper main region 253 of the upper major surface 25 of the lower modular planar interconnect device 2. The cell-body support frame 32 is disposed to surround and support a periphery of the planar cell body 33, and has upper front and rear support regions 321, 322 and lower right and left support regions 323, 324. The upper front and rear support regions 321, 322 are opposite to each other in the transverse direction (B), and respectively mate with the second inlet and outlet regions 244, 245 of the lower major surface 24 of the upper modular planar interconnect device 2. The lower right and left support regions 323, 324 are opposite to each other in the longitudinal direction (A), and respectively mate with the first inlet and outlet regions 254, 255 of the upper major surface 25 of the lower modular planar interconnect device 2.

The anode web 34 is sandwiched between the planar cell body 33 and the major region 243 of the lower major surface 24 of the upper modular planar interconnect device 2. The anode frame 36 is disposed to surround and support a periphery of the anode web 34, and has front and rear anode frame regions 361, 362 which are opposite to each other in the transverse direction (B), and which respectively mate with the second inlet and outlet regions 244, 245 of the lower major surface 24 of the upper modular planar interconnect device 2.

The cathode web 35 is sandwiched between the planar cell body 33 and the major region 253 of the upper major surface 25 of the lower modular planar interconnect device 2. The cathode frame 37 is disposed to surround and support a periphery of the cathode web 35, and has right and left cathode frame regions 371, 372 which are opposite to each other in the longitudinal direction (A), and which respectively mate with the first inlet and outlet regions 254, 255 of the upper major surface 25 of the lower modular planar interconnect device 2.

Figure 5:
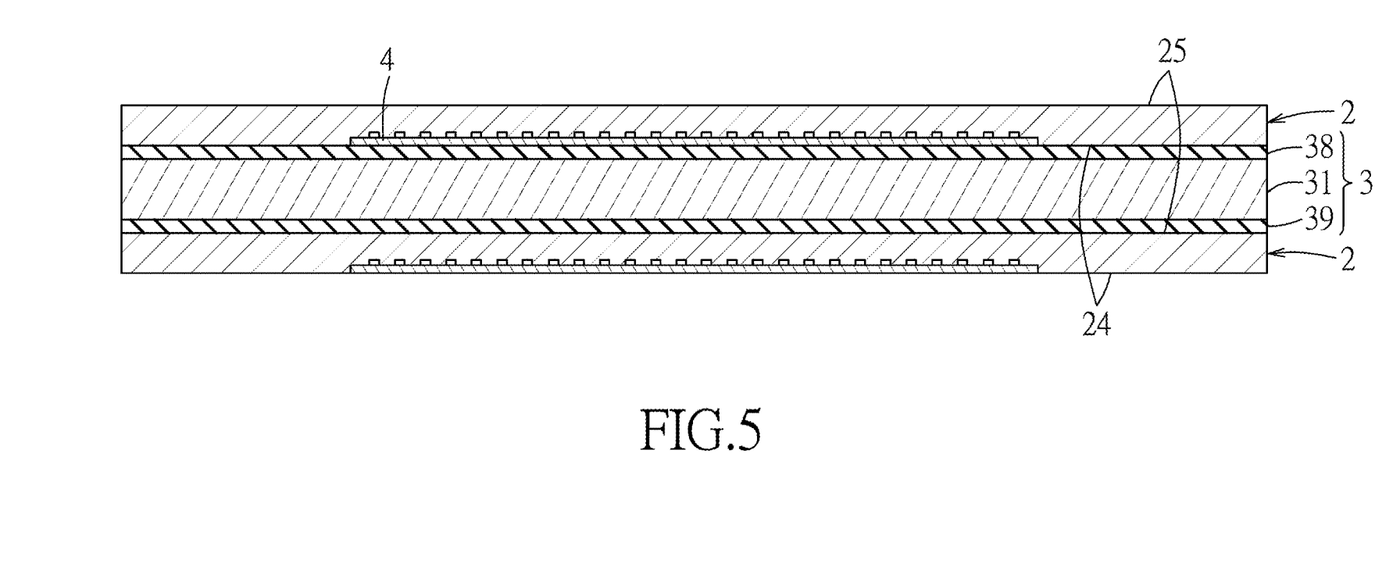
FIG. 5 is a schematic sectional view of the embodiment of the solid oxide fuel cell taken along line V-V in FIG. 3.
Figure 6:
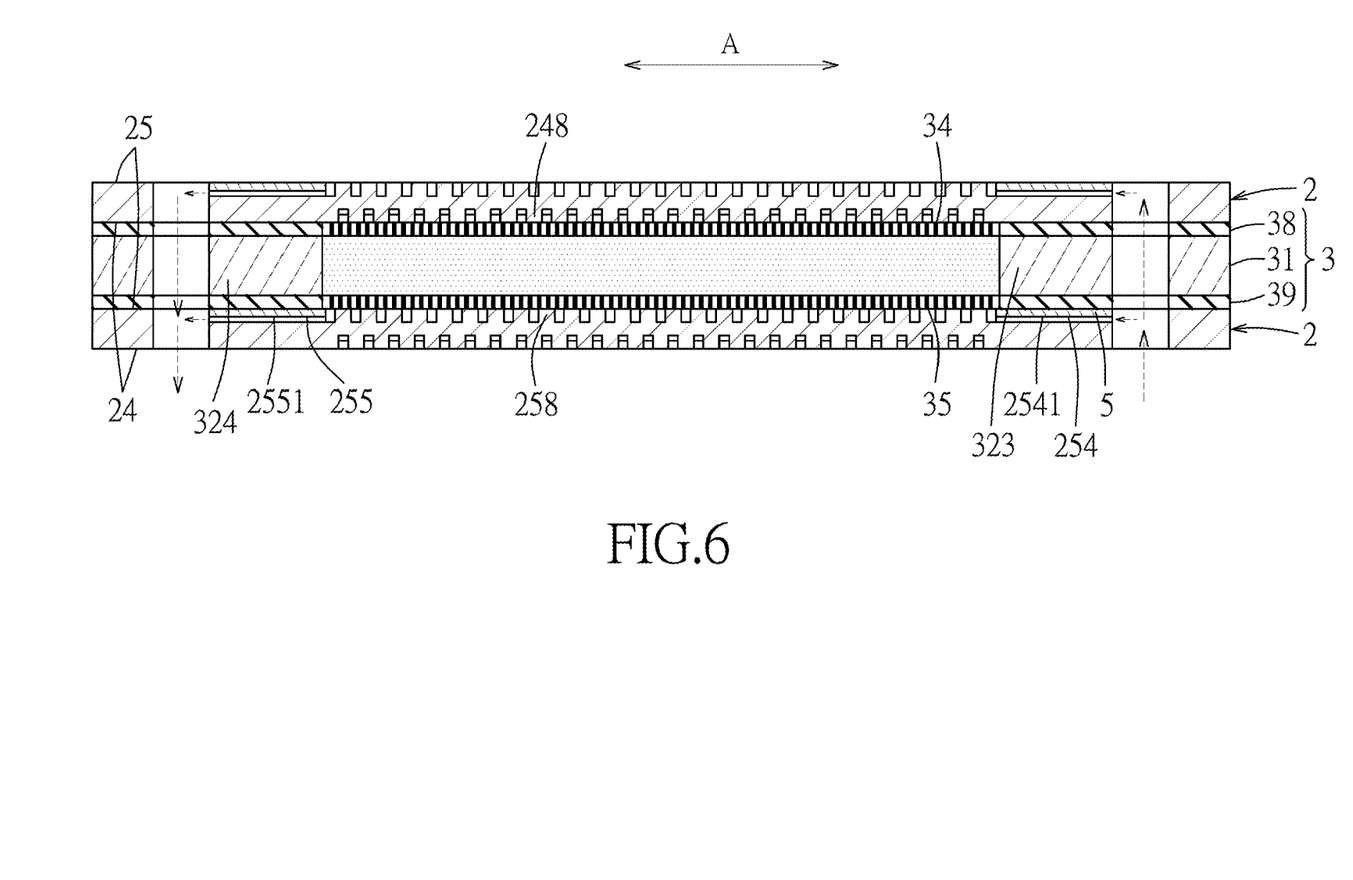
FIG. 6 is a schematic sectional view of the embodiment of the solid oxide fuel cell taken along line VI-VI in FIG. 3.

The upper first auxiliary seal member is disposed between one of the front and rear anode frame regions 361, 362 of the anode frame 36 and a corresponding one of the second inlet and outlet regions 244, 245 of the lower major surface 24 of the upper modular planar interconnect device 2 to form a fluid-tight seal therebetween. The solid oxide fuel cell 1 further includes an upper second auxiliary seal member which is disposed between the other of the front and rear anode frame regions 361, 362 of the anode frame 36 and a corresponding one of the second inlet and outlet regions 244, 245 of the lower major surface 24 of the upper modular planar interconnect device 2 to form a fluid-tight seal therebetween. In addition, the solid oxide fuel cell 1 includes an upper first primary seal member and an upper second primary seal member. The upper first primary seal member is disposed between one of the right and left anode frame regions 363, 364 of the anode frame 36 and a corresponding one of right and left portions of the lower main region 243 of the lower major surface 24 of the upper modular planar interconnect device 2 to form a fluid-tight seal therebetween. The upper second primary seal member is disposed between the other of the right and left anode frame regions 363, 364 of the anode frame 36 and a corresponding one of the right and left portions of the lower main region 243 of the lower major surface 24 of the upper modular planar interconnect device 2 to form a fluid-tight seal therebetween. The upper first and second auxiliary seal members and the upper first and second primary seal members are independently made from a material selected from the group consisting of glass-ceramic, mica, soldering alloy, and combinations thereof. In the embodiment, the upper first and second auxiliary seal members and the upper first and second primary seal members are integrally formed with the anode frame 36. In other words, the anode frame 36 in the embodiment is made from glass-ceramic, mica, soldering alloy, or combinations thereof, and an upper surface thereof is used as a combination of the upper first and second auxiliary seal members and the upper first and second primary seal members.

The lower first auxiliary seal member is disposed between one of the right and left cathode frame regions 371, 372 of the cathode frame 37 and a corresponding one of the first inlet and outlet regions 254, 255 of the upper major surface 25 of the lower modular planar interconnect device 2 to form a fluid-tight seal therebetween. The solid oxide fuel cell 1 further includes a lower second auxiliary seal member which is disposed between the other of the right and left cathode frame regions 371, 372 of the cathode frame 37 and a corresponding one of the first inlet and outlet regions 254, 255 of the upper major surface 25 of the lower modular planar interconnect device 2 to form a fluid-tight seal therebetween. In addition, the solid oxide fuel cell 1 includes a lower first primary seal member and a lower second primary seal member. The lower first primary seal member is disposed between one of the front and rear cathode frame regions 373, 374 of the cathode frame 37 and a corresponding one of front and rear portions of the upper main region 253 of the upper major surface 25 of the lower modular planar interconnect device 2 to form a fluid-tight seal therebetween. The lower second primary seal member is disposed between the other of the front and rear cathode frame regions 373, 374 of the cathode frame 37 and a corresponding one of the front and rear portions of the upper main region 253 of the upper major surface 25 of the lower modular planar interconnect device 2 to form a fluid-tight seal therebetween. The lower first and second auxiliary seal members and the lower first and second primary seal members are independently made from a material selected from the group consisting of glass-ceramic, mica, soldering alloy, and combinations thereof. In the embodiment, the lower first and second auxiliary seal members and the lower first and second primary seal members are integrally formed with the cathode frame 37. In other words, the cathode frame 37 in the embodiment is made from glass-ceramic, mica, soldering alloy, or combinations thereof, and a lower surface thereof is used as a combination of the lower first and second auxiliary seal members and the lower first and second primary seal members.

As described above, in the modular planar interconnect device 2 of the disclosure, the upper shielding plates 5 are configured to be respectively fitted between the front and rear boundary wall surfaces 2542, 2543 of the first inlet region 254 and between the front and rear boundary wall surfaces 2552, 2553 of the first outlet region 255. Therefore, the portions of the grooved channels 256 in the first inlet region 254 and the first outlet region 255 are isolated from the right and left cathode frame regions 371, 372 of the cathode frame 37 by the upper shielding plates 5. Accordingly, the front and rear cathode frame regions 373, 374 of the cathode frame 37 may be sealed to the front and rear portions of the upper main region 253 of the upper major surface 25 of the modular planar interconnect device 2, and the right and left cathode frame regions 371, 372 of the cathode frame 37 may also be sealed to the upper shielding plates 5 such that a sealing effect between the cathode frame 37 and the upper major surface 25 of the modular planar interconnect device 2 may be enhanced, and the aforesaid disadvantage of the prior art may be avoided.

Similarly, as described above, the lower shielding plates 4 are configured to be respectively fitted between the right and left boundary wall surfaces 2442, 2443 of the second inlet region 244 and between the right and left boundary wall surfaces 2452, 2453 of the second outlet region 245. Therefore, the portions of the grooved channels 246 in the second inlet region 244 and the second outlet region 245 are isolated from the front and rear anode frame regions 361, 362 of the anode frame 36 by the lower shielding plates 4. Accordingly, the right and left anode frame regions 363, 364 of the anode frame 36 may be sealed to the right and left portions of the lower main region 243 of the lower major surface 24 of the modular planar interconnect device 2, and the front and rear anode frame regions 361, 362 of the anode frame 36 may also be sealed to the lower shielding plates 4 such that a sealing effect between the anode frame 36 and the lower major surface 24 of the modular planar interconnect device 2 may be enhanced.

Examples of the disclosure will be described hereinafter. It is to be understood that these examples are exemplary and explanatory and should not be construed as a limitation to the disclosure.

Example 1

The aforesaid embodiment of the modular planar interconnect device 2 was used in a solid oxide fuel cell. In the modular planar interconnect device 2, a cross-section of the grooved channels 246 at a juncture between the lower main region 243 of the lower major surface 24 and the second inlet region 244 is about 22.1 mm$^2$, and a cross-section of the grooved channels 246 at a juncture between the lower main region 243 of the lower major surface 24 and the second outlet region 245 is about 13.26 mm$^2$. A mixed gas of hydrogen and nitrogen (containing 3% steam) was introduced into the grooved channels 246 via the second inlet ports 2461 and was allowed to exit the grooved channels 246 via the second outlet ports 2462. Dry air was introduced into the grooved channels 256 via the first inlet ports 2561 and was allowed to exit the grooved channels 256 via the first outlet ports 2562. The solid oxide fuel cell was operated for a period of 100 hours. Maximum power density (650° C.), fuel utilization, and power efficiency (620° C.) of the solid oxide fuel cell were measured using an electronic load (tensile load current: 34.2 A, operating voltage: 0.6-0.7 V). The results are shown in Table 1.

Example 2

The procedure of Example 1 was repeated except that both of the cross-section of the grooved channels 246 at a juncture between the lower main region 243 of the lower major surface 24 and the second inlet region 244 and the cross-section of the grooved channels 246 at a juncture between the lower main region 243 of the lower major surface 24 and the second outlet region 245 are about 22.1 mm$^2$. The results of the maximum power density (650° C.), the fuel utilization, and the power efficiency (620° C.) are shown in Table 1.

TABLE 1

|  | Maximum power density | Fuel utilization | Power efficiency |
|---|---|---|---|
| Ex. 1 | 0.643 W/cm$^2$ | 71.69% | 38.37% |
| Ex. 2 | 0.602 W/cm$^2$ | 67.71% | 36.18% |

As shown in Table 1, the maximum power density, the fuel utilization, and the power efficiency of the solid oxide fuel cell may be further enhanced when a cross-section of the grooved channels 246 at a juncture between the lower main region 243 and the second inlet region 244 of the lower major surface 24 is larger than a cross-section thereof at a juncture between the lower main region 243 and the second outlet region 245 of the lower major surface 24.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A solid oxide fuel cell, comprising:
   upper and lower modular planar interconnect devices, each of said upper and lower modular planar interconnect devices including
      a planar interconnect body including
         an upper major surface including
            a right marginal region,
            a left marginal region disposed opposite to said right marginal region in a longitudinal direction,
            an upper main region disposed between said right and left marginal regions for underlying the cathode web of an upper one of the planar cell units,
            a first inlet region for an oxygen-containing fluid, said first inlet region being disposed between said right marginal region and said upper main region and being formed with a first inlet depression area that is recessed from said upper major surface downwardly and inwardly so as to form front and rear boundary wall surfaces that are spaced apart from each other in a transverse direction,
            a first outlet region for the oxygen-containing fluid, said first outlet region being disposed between said left marginal region and said upper main region and being formed with a first outlet depression area that is recessed from said upper major surface downwardly and inwardly so as to form front and rear boundary wall surfaces that are spaced apart from each other in the transverse direction, and
            a plurality of grooved channels which are formed in said upper main region of said upper major surface, and which extend through said first inlet region to terminate at a plurality of first inlet ports and further through said first outlet region to terminate at a plurality of first outlet ports,
         and
         a lower major surface including
            a front marginal region,
            a rear marginal region disposed opposite to said front marginal region in the transverse direction,
            a lower main region disposed between said front and rear marginal regions for overlying the anode web of a lower one of the planar cell units,
            a second inlet region for a fuel fluid, said second inlet region being disposed between said front marginal region and said lower main region and being formed with a second inlet depression area that is recessed from said lower major surface upwardly and inwardly so as to form right and left boundary wall surfaces that are spaced apart from each other in the longitudinal direction,
            a second outlet region for the fuel fluid, said second outlet region being disposed between said rear marginal region and said lower main region and being formed with a second outlet depression area that is recessed from said lower major surface upwardly and inwardly so as to form right and left boundary wall surfaces that are spaced apart from each other in the longitudinal direction, and
            a plurality of grooved channels which are formed in said lower main region of said lower major surface, and which extend through said second inlet region to terminate at a plurality of second inlet ports and further through said second outlet region to terminate at a plurality of second outlet ports;
      a pair of upper shielding plates configured to be respectively fitted between said front and rear boundary wall surfaces of said first inlet region and between said front and rear boundary wall surfaces of said first outlet region; and
      a pair of lower shielding plates configured to be respectively fitted between said right and left boundary wall surfaces of said second inlet region and between said right and left boundary wall surfaces of said second outlet region;
   a planar cell unit sandwiched between said upper and lower modular planar interconnect devices and including
      a planar cell member including
         a planar cell body interposed between said lower main region of said lower major surface of said upper modular planar interconnect device and said upper main region of said upper major surface of said lower modular planar interconnect device, and a cell-body support frame disposed to surround and support a periphery of said planar cell body and having upper front and rear support regions which are opposite to each other in the transverse direction, and which respectively mate with said second inlet and outlet regions of said lower major surface of said upper modular planar interconnect device, and lower right and left support regions which are opposite to each other in the longitudinal direction, and which respectively mate with said first inlet and outlet regions of said upper major surface of said lower modular planar interconnect device, an anode member including an anode web sandwiched between said planar cell body and said lower major region of said lower major surface of said upper modular planar interconnect device, and an anode frame disposed to surround and support a periphery of said anode web and having front and rear anode frame regions which are opposite to each other in the transverse direction, and which respectively mate with said second inlet and outlet regions of said lower major surface of said upper modular planar interconnect device, a cathode member including a cathode web sandwiched between said planar cell body and said upper major region of said upper major surface of said lower modular planar interconnect device, and a cathode frame disposed to surround and support a periphery of said cathode web and having right and left cathode frame regions which are opposite to each other in the longitudinal direction, and which respectively mate with said first inlet and outlet regions of said upper major surface of said lower modular planar interconnect device;

an upper first auxiliary seal member disposed between one of said front and rear anode frame regions of said anode frame and a corresponding one of said second inlet and outlet regions of said lower major surface of said upper modular planar interconnect device to form a fluid-tight seal therebetween; and a lower first auxiliary seal member disposed between one of said right and left cathode frame regions of said cathode frame and a corresponding one of said first inlet and outlet regions of said upper major surface of said lower modular planar interconnect device to form a fluid-tight seal therebetween.

2. The solid oxide fuel cell according to claim 1, further comprising:

an upper second auxiliary seal member disposed between the other of said front and rear anode frame regions of said anode frame and a corresponding one of said second inlet and outlet regions of said lower major surface of said upper modular planar interconnect device to form a fluid-tight seal therebetween; and a lower second auxiliary seal member disposed between the other of said right and left cathode frame regions of said cathode frame and a corresponding one of said first inlet and outlet regions of said upper major surface of said lower modular planar interconnect device to form a fluid-tight seal therebetween.

3. The solid oxide fuel cell according to claim 2, wherein said upper second auxiliary seal member is integrally formed with said anode frame, and said lower second auxiliary seal member is integrally formed with said cathode frame.

4. The solid oxide fuel cell according to claim 3, wherein said upper second auxiliary seal member is made from a material selected from the group consisting of glass-ceramic, mica, soldering alloy, and combinations thereof, and said lower second auxiliary seal member is made from a material selected from the group consisting of glass-ceramic, mica, soldering alloy, and combinations thereof.

5. The solid oxide fuel cell according to claim 1, wherein said upper first auxiliary seal member is integrally formed with said anode frame, and said lower first auxiliary seal member is integrally formed with said cathode frame.

6. The solid oxide fuel cell according to claim 5, wherein said upper first auxiliary seal member is made from a material selected from the group consisting of glass-ceramic, mica, soldering alloy, and combinations thereof, and said lower first auxiliary seal member is made from a material selected from the group consisting of glass-ceramic, mica, soldering alloy, and combinations thereof.

* * * * *